(No Model.)  5 Sheets—Sheet 1.
A. CARRARA.
APPARATUS FOR RECORDING FARES BY OMNIBUSES, &c.
No. 445,042.  Patented Jan. 20, 1891.

(No Model.) 5 Sheets—Sheet 3.

A. CARRARA.
APPARATUS FOR RECORDING FARES BY OMNIBUSES, &c.

No. 445,042. Patented Jan. 20, 1891.

(No Model.) 5 Sheets—Sheet 4.

A. CARRARA.
APPARATUS FOR RECORDING FARES BY OMNIBUSES, &c.

No. 445,042. Patented Jan. 20, 1891.

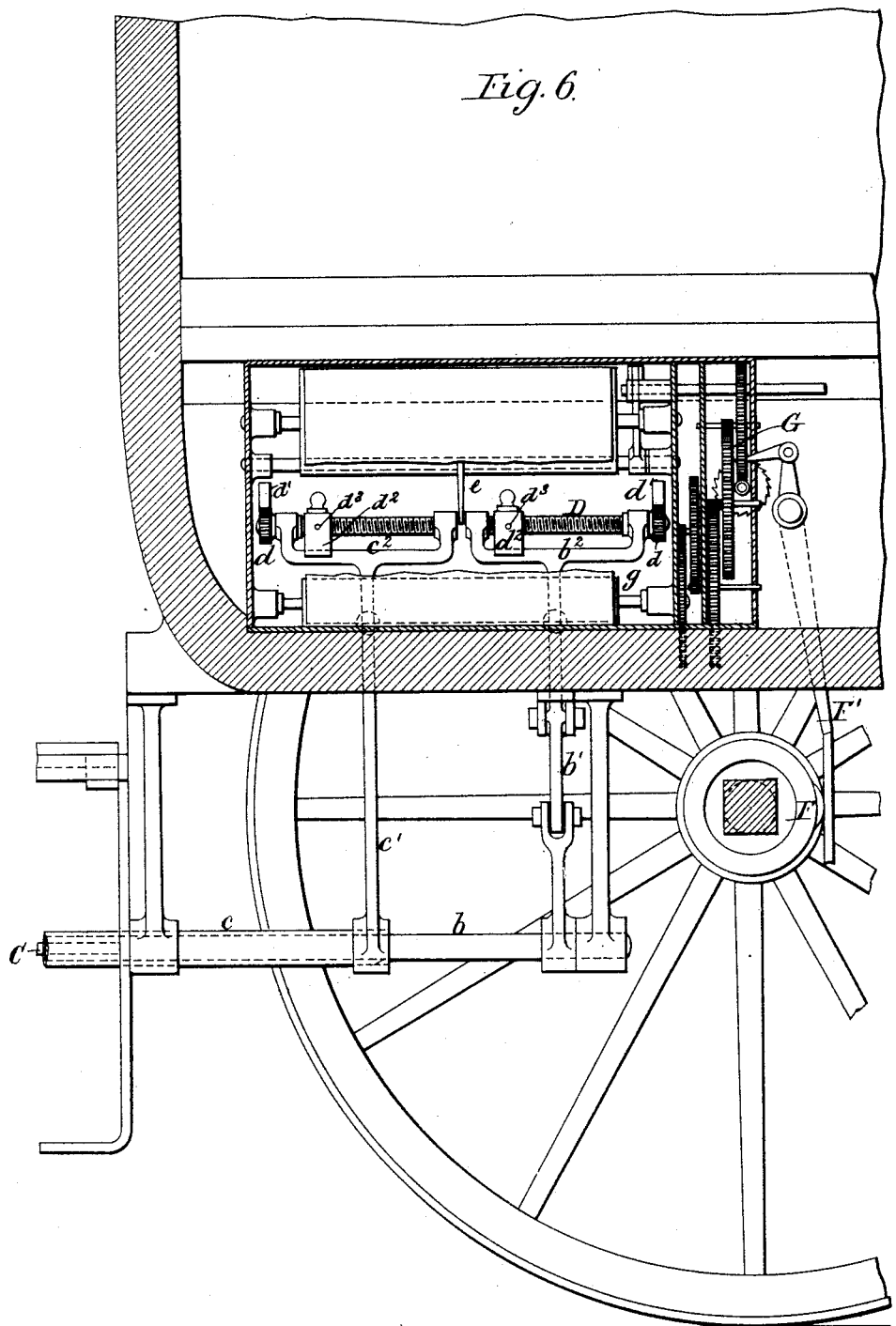

UNITED STATES PATENT OFFICE.

ARTHUR CARRARA, OF GOVERNOR LANE, GIBRALTAR.

APPARATUS FOR RECORDING FARES BY OMNIBUSES, &c.

SPECIFICATION forming part of Letters Patent No. 445,042, dated January 20, 1891.

Application filed April 10, 1890. Serial No. 347,332. (No model.) Patented in England June 12, 1889, No. 9,720; in France March 5, 1890, No. 204,173, and in Belgium March 5, 1890, No. 89,724.

*To all whom it may concern:*

Be it known that I, ARTHUR CARRARA, a citizen of England, residing at Governor Lane, Gibraltar, have invented a new and useful Apparatus for Checking the Fares of Passengers by an Omnibus or other Public Conveyance, (for which I have obtained patents in Great Britain, dated June 12, 1889, No. 9,720; in France, dated March 5, 1890, No. 204,173, and in Belgium, dated March 5, 1890, No. 89,724,) of which the following is a specification.

This invention has for its object to provide novel mechanism for automatically recording the entrances and exits of passengers to and from an omnibus or other public conveyance in such manner that every time a passenger enters the conveyance the fact is indicated by a marker on one part of a moving sheet of paper, and every time a passenger leaves the conveyance another marker indicates the fact on another part of the moving sheet. To accomplish this object my invention involves the features of construction, the combination or arrangement of devices, and the principles of operation hereinafter described and claimed, reference being made to the accompanying drawings, in which—

Figure 1:
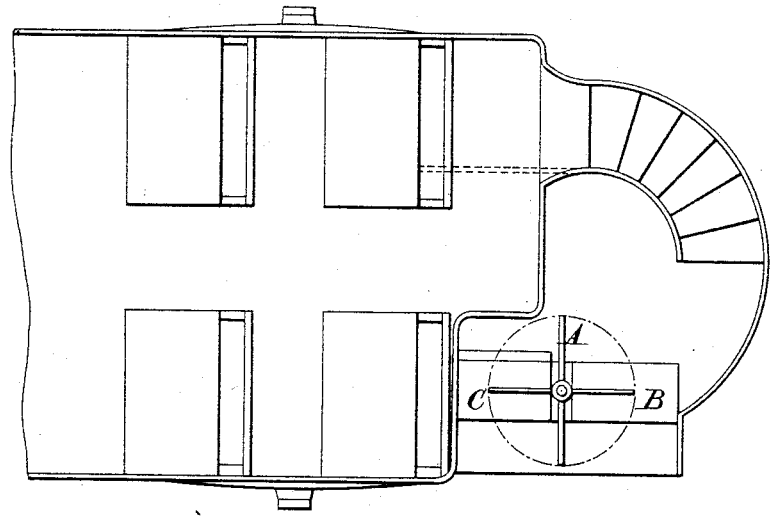
Figure 2:
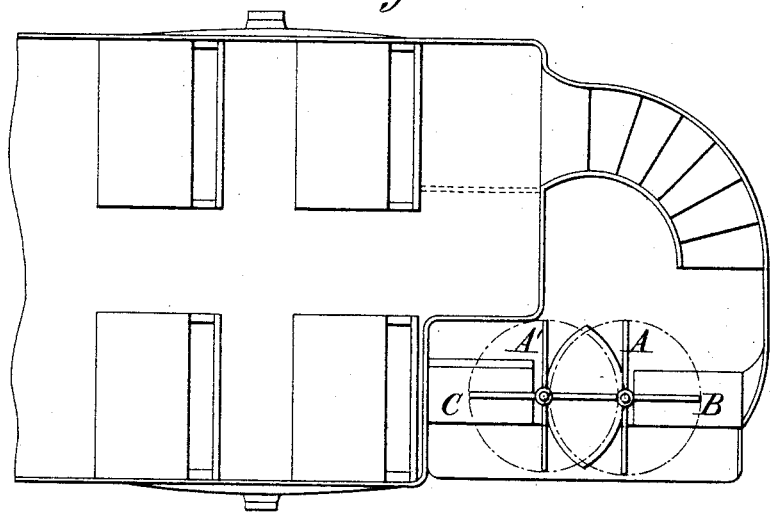
Figure 3:
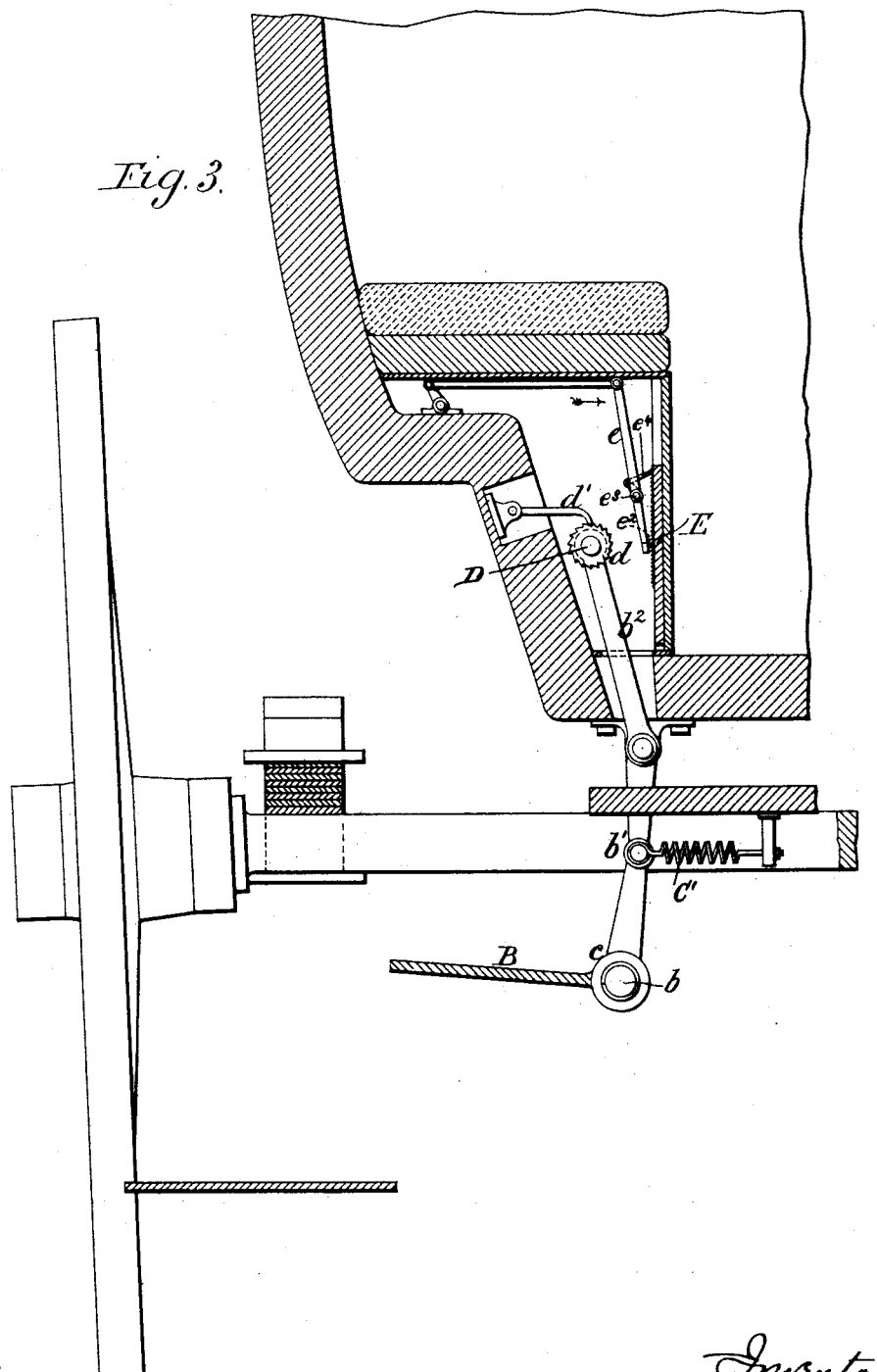
Figure 4:
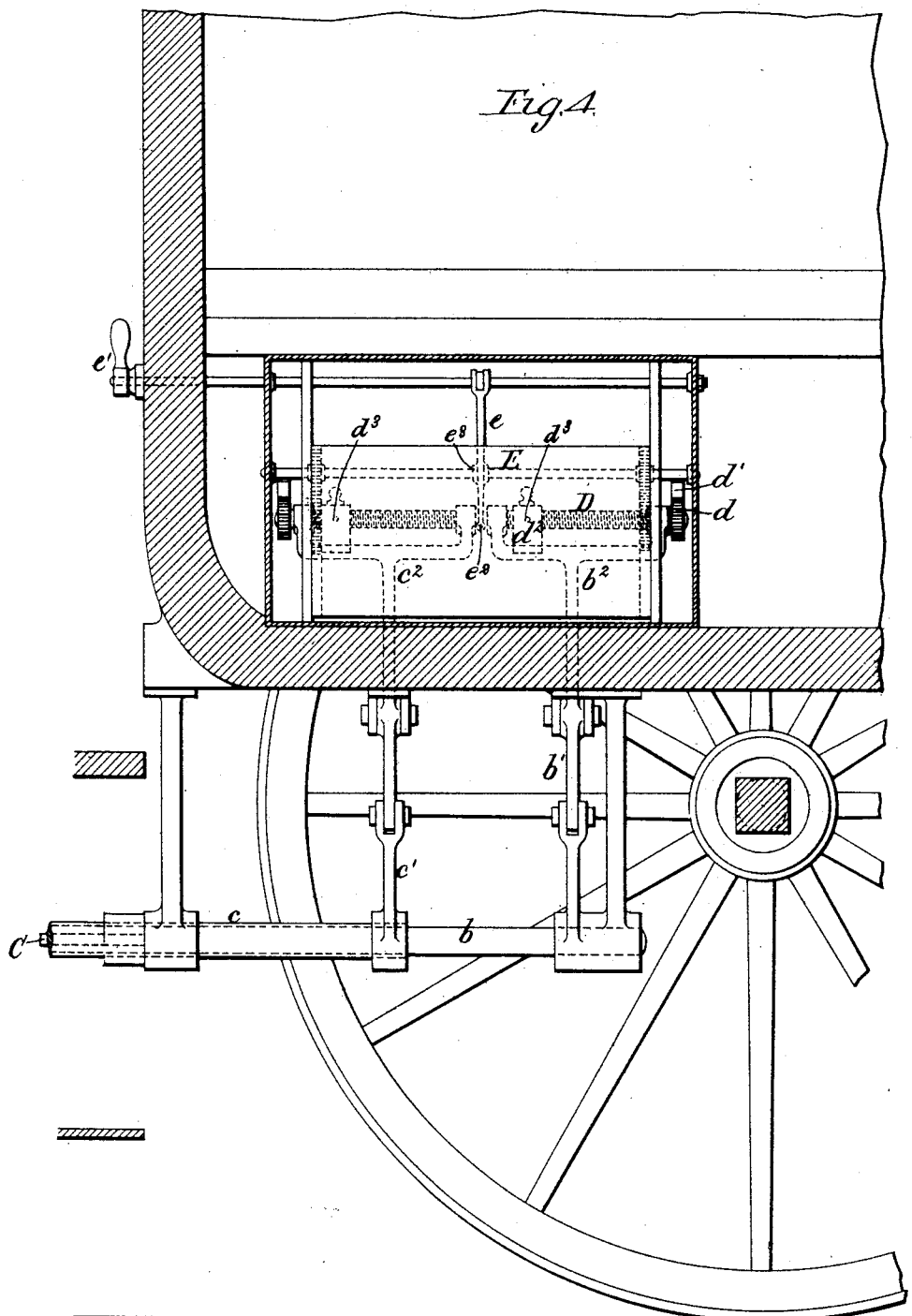
Figure 5:
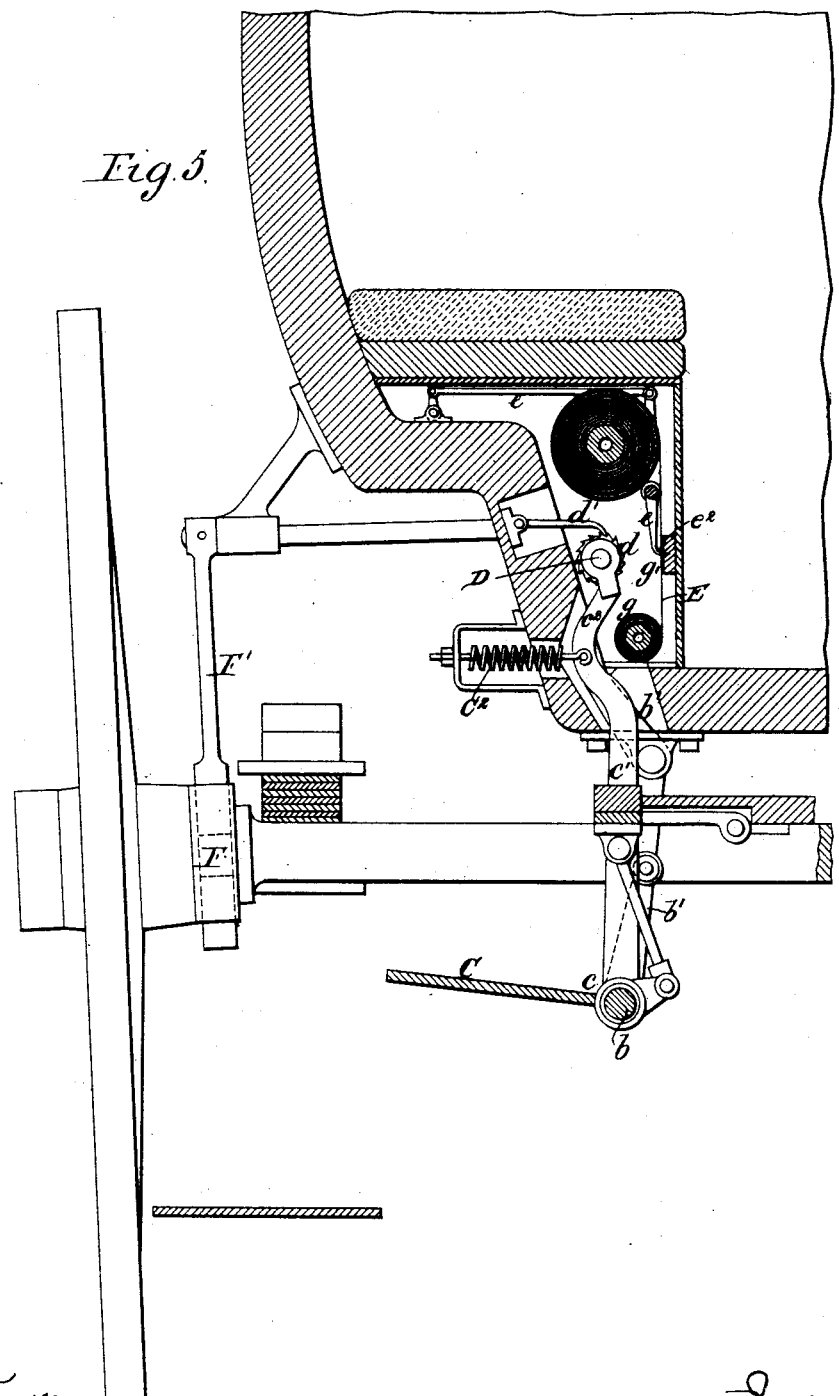

Figure 1 of the accompanying drawings is a plan of the rear end of an omnibus or car with a turnstile for the entrance and exit of passengers. Fig. 2 is a corresponding plan showing two turnstiles, the one for entrance and the other for exit. Fig. 3 is a part transverse section, and Fig. 4 is a part longitudinal section, showing means whereby the entrances and exits of passengers serve to mark a card, the position of the card being set by hand. Figs. 5 and 6 are corresponding sections showing the movement of the paper effected by that of the vehicle itself.

Referring to Fig. 1, A is a turnstile having its arms extending over two steps B for entrance and C for exit of passengers. The turnstile A being provided, as usual, with a ratchet and pawl, so that it can turn in only one direction, entering passengers must tread on the step B and leaving passengers on the step C. Both these steps are subject to springs, as at C', Fig. 3, and C², Fig. 5, so that the steps can yield a little to the tread, their movements operating the marking apparatus, as will hereinafter be described.

As shown in Fig. 2, there are two turnstiles A A', having their arms at different levels, so that they can revolve clear of each other. These can revolve only in the one direction, so that passengers must tread on the steps B and C, according as they are entering or are leaving the vehicle.

When the vehicle is a public conveyance, such as an omnibus, having its journey divided into a number of courses, for each of which a fare is charged, the arrangement for marking entrances and exits of passengers may be such as is shown in Figs. 3 and 4.

B represents one of the two steps fixed on a shaft $b$, inclosed in a tubular shaft $c$, to which the other step C is fixed, so that, according as the one step or the other is trod upon, the central shaft $b$ or the tubular shaft $c$ is partly turned on its axis to swing the lever $b'$, which is connected with the spring C', Fig. 3. The shaft $b$ is connected by levers $b'$ to an oscillating frame $b^2$, and the tubular shaft $c$ is in like manner connected by lever $c'$ to a similar frame $c^2$, such lever $c'$ being connected with the spring C², Fig. 5. Both these frames are alike in construction and operation, as I shall describe with reference to $b^2$. In it is mounted a screw D, having at its end a ratchet-wheel $d$, engaged by a pawl $d'$. The nut $d^2$, which fits on the screw D, is guided by the lower limb of the frame $b^2$, along which it can slide, and this nut carries a pricker or punch, (indicated by $d^3$, Figs. 4 and 6.) In front of this is a card or sheet E for receiving the marks of the pricker or punch. The card or sheet E is fitted in a vertically-sliding frame, which carries a ratchet-rack engaged by a pawl $e^4$ on a lever $e$, pivoted at $e^3$, and which can be moved by an external handle $e'$, this lever $e$ having also a marker at its lower end, as at $e^2$, Fig. 3. The conductor or other official, when the vehicle reaches the end of one course and is beginning the next, by means of the handle $e'$ moves the lever $e$, thus causing the sheet E to move vertically a distance equal to one tooth of its rack, the marker on $e$ at the same time making a mark on the middle of the sheet E. The sheet is advanced by the free end of the upwardly-inclined pawl $e^4$, rising vertically when the handle $e'$ is so operated as to cause the lever $e$ to swing in the direction of the arrow, Fig. 3. If now a passenger enters the vehicle, by treading on the step B, Figs. 1 and 2, he moves the frame $b^2$ toward the sheet E, and the punch or pricker on $d^2$ makes a mark on the sheet E. When the step B is relieved from the tread, it is raised by a spring, and the frame $b^2$ makes its back-stroke. In making this back-stroke its ratchet-wheel $d$ is partly turned by the pawl $d'$, and the screw D, being thus partly turned in its nut $d^2$, causes the nut to move a little horizontally. If now a second passenger enters, the punch or pricker on $d^2$ makes a second mark on E, but a little to the side of the former mark. Thus as passenger after passenger enters the vehicle mark after mark is made in a horizontal row in line with the mark made by the marker on the lever $e$. Similarly the frame $c^2$ is moved by passengers leaving the vehicle, and thus the sheet E receives two sets of marks, showing the passengers entering and leaving during each course.

Instead of moving the sheet E by hand, as above described, it may be moved by the vehicle itself, as I shall describe, referring to Figs. 5 and 6. In this case a cam F on the nave of one of the wheels of the vehicle once in every revolution moves a lever F', which by means of a pawl and ratchet gives motion through a train of gearing G to a paper roller $g$, which draws the paper sheet E from an upper roller in front of a pad $g'$. The marking apparatus is similar to that shown in Figs. 3 and 4, and its parts are marked by similar letters of reference. In this case there may be a lever $e$, moved by hand, to mark the courses, if desired; but as the paper is caused to travel by the travel of the vehicle the marks on it representing the numbers of entering and leaving passengers serve also, by their position on the paper, to show the parts of the journey where the entrances and exits occur.

In order to avoid confusion of marks when a number of passengers enter or leave the vehicle at the same time, the markers are made to have a little transverse movement relatively to the paper, so that each mark is a little to one side of the preceding mark. The paper being graduated by lines representing the distance corresponding to the particular courses into which the journey is divided, there is thus obtained a record of all the passengers that enter and leave the vehicle and of the particular parts of the journey where these entrances and exits take place. Assuming that the journey is divided into a number of courses not necessarily equal in length, but each course subject to a predetermined fare, then, the paper being graduated at intervals proportional to these courses or being examined by a scale so graduated, it is easy to compute from the numbers and positions of the marks on the paper the total fares that should have been collected during the journey. This may be done by adding together all the fares of those that enter reckoned from the place of entrance to the end of the journey and subtracting from that sum all the fares of those that leave, also reckoned from the place of leaving to the end; or the total may be computed by ascertaining from the marks the number of passengers carried over each course, multiplying that number by the fare for each course, and adding the products.

Having thus described the nature of my invention and the best means I know for carrying the same into practical effect, I claim—

1. The combination, with a vehicle, of a yielding step, a shaft supporting the step and having a lever, a swinging frame actuated by the lever when the step is depressed, a traveling marker carried by the swinging frame for marking or recording on a sheet of paper, and means for feeding the paper, substantially as described.

2. The combination, with a vehicle having a yielding step, of a swinging frame actuated by the movement of the step, a rotating screw mounted in the swinging frame and carrying a nut having a marker to mark or record on a sheet of paper, and means for feeding the paper, substantially as described.

3. The combination, with a vehicle having a yielding step, of a shaft supporting the step and having a lever, a swinging frame connected with the lever and actuated thereby when the step is depressed, a rotating screw mounted in the swinging frame, a traveling nut engaged with the screw and having a marker to mark or indicate on a sheet of paper, and means for feeding the paper, substantially as described.

4. The combination, with a vehicle having yielding steps for the entrance and exit of passengers, of independent swinging frames connected with and swung by the steps when depressed, a rotating screw mounted in each frame and carrying a traveling nut which is provided with a marker to mark or record on a sheet of paper, and means for feeding the paper, substantially as described.

5. The combination, with a vehicle having yielding steps for the entrance and exit of passengers, of independent swinging frames connected with and swung by the steps when depressed, a rotating screw mounted in each frame and carrying a traveling nut having a marker to mark or record on a sheet of paper, a paper-roller, and mechanism actuated by a wheel of the vehicle for rotating the paper-roller to automatically feed the paper, substantially as described.

In testimony whereof I have signed my name to this specification, in the presence of two subscribing witnesses, this 19th day of March, A. D. 1890.

ARTHUR CARRARA.

Witnesses:
  A. M. CAPURRO,
  JOSE RADA.